United States Patent

[11] 3,555,290

[72] Inventor Walter Ellermeyer
 4878 Niagara Ave. Apt. 10, San Diego, Calif. 92107
[21] Appl. No. 828,900
[22] Filed May 29, 1969
[45] Patented Jan. 12, 1971

[54] SECOND-HIGHEST REDUNDANT VOLTAGE SELECTOR
 11 Claims, 4 Drawing Figs.
[52] U.S. Cl. .................................................... 307/65, 307/204, 307/219
[51] Int. Cl. .................................................... H02j 9/00
[50] Field of Search .......................................... 307/65, 64, 43, 52, 60, 80, 82, 84, 130, 125, 204, 219; 317/137

[56] References Cited
 UNITED STATES PATENTS
 3,293,452 12/1966 Horwitz et al. ............... 317/137X Primary Examiner—Robert K. Schaefer
Assistant Examiner—H. J. Hohauser
Attorneys—J. C. Warfield, Jr., George J. Rubens and John W. McLaren ABSTRACT: A second-highest redundant voltage selector which continually compares the voltage outputs of three identical electrical units and continuously selects the preferred voltage to drive a following electrical state. The selection of the second-highest of three input voltages is accomplished by the use of three two-input comparators. The output of each comparator indicates which of the two voltages connected to it is the higher and which is the lower. The outputs of the comparators actuate switching circuitry which continually selects the second-highest of the three input voltages. Malfunction of the invention will never produce a faulty output voltage. Regardless of any malfunction of the invention, the preferred voltage will be within acceptable limits if the three redundant input voltages are within acceptable limits.

INVENTOR.
WALTER ELLERMEYER
BY
ATTORNEYS

3,555,290

SECOND-HIGHEST REDUNDANT VOLTAGE SELECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The use of redundant voltages can greatly reduce the time period that some types of electrical or electronic equipment are inoperative due to component failure. In many cases, the use of redundant voltages may even eliminate such time entirely. Redundant voltages can also improve the long term accuracy of equipment. Existing second-highest voltage selectors used with redundant voltages have several disadvantages and limitations. One prior art device relies on the use of diodes to produce an output voltage which is equal to the second-highest redundant voltage. The output voltage, however, is never exactly equal to the second-highest redundant voltage because diodes have varying finite resistance which varies even further with temperature. Even if an ideal diode could be used with the prior art, the accuracy of the device would not be high since diodes do not carry identical currents. Furthermore, the circuits of the prior art can only be used with DC voltages and in-phase AC voltages of moderate amplitude and low frequency. Also the prior art device can only supply small currents. Failure of the components of the circuit or failure of the power supply will produce a faulty output voltage even though all three redundant voltages are within acceptable limits.

SUMMARY OF THE INVENTION

A second-highest voltage selector for use with triple redundant voltages is disclosed. The invention continuously monitors the relative magnitude of the voltage outputs of three identical electrical or electronic units and continuously selects the preferred voltage to drive a following electrical or electronic stage. For example, the electrical units supplying the redundant voltages might be three generators. The invention includes switching circuitry which operates to connect the stage to be driven with the voltage which is closest to the average value of the three voltages. If this voltage becomes faulty, the switching circuit of the invention automatically switches the stage to one of the other voltages. Selection of the second-highest of the three input voltages is accomplished by the use of three two-input comparators. The output of each comparator indicates which of the two voltages connected to it is the higher and which is the lower. Relay coils are connected between the outputs of the comparators. These relays select the second-highest of the three input voltages. Alternate methods of selecting the second-highest voltage are also disclosed.

Use of the invention is not limited to the final output of an electronic unit. An electronic unit usually consists of a chain of subunits. If there is a subunit which is the weak link in this chain, the invention may be used to prevent the disabling of the unit due to malfunctions of the subunits. The invention may be used in the control and measurement of pressure, temperature, motor speed, etc., and in all types of servomechanisms.

STATEMENT OF THE OBJECTS OF THE INVENTION

The object of the present invention is to provide a second-highest redundant voltage selector which compares the voltage output of three identical electrical units and continuously selects the preferred voltage to drive a following electrical stage;

Another object of the present invention is to provide a second-highest redundant voltage selector which can be used to monitor any physical quantity which can be converted to a fixed or varying DC voltage.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
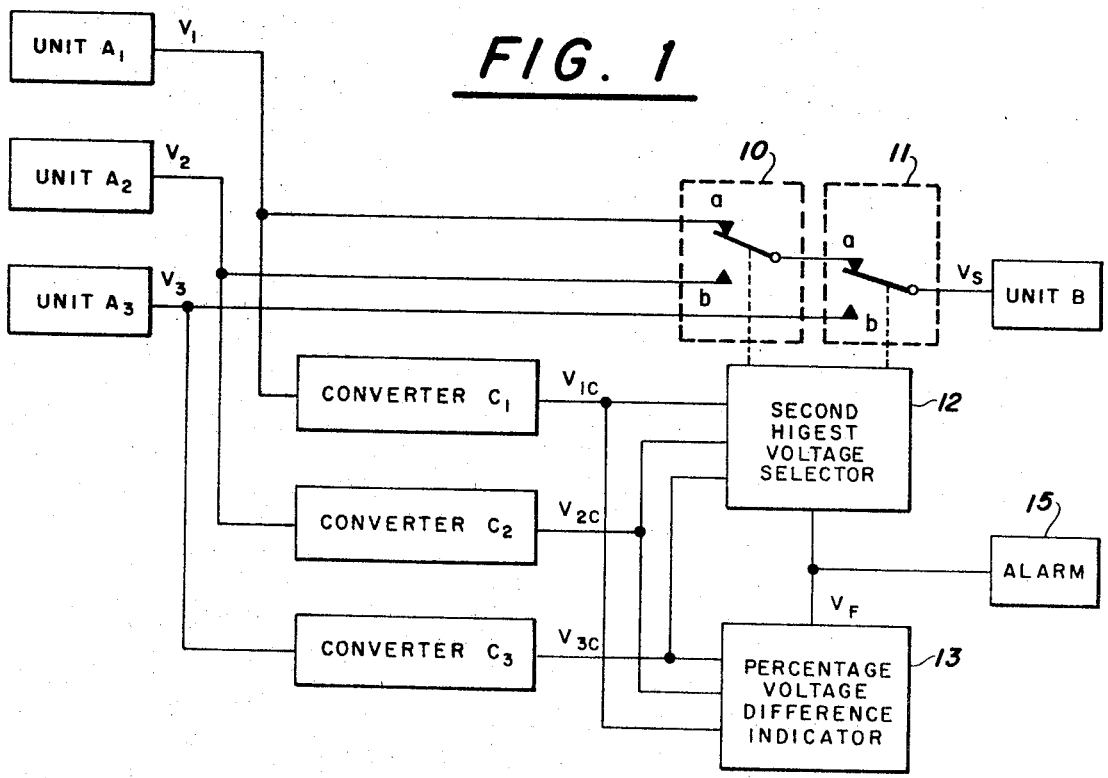
FIG. 1 is a schematic block diagram of a system incorporating the second-highest voltage selector.

FIG. 1 is a schematic block diagram of a system incorporating the second-highest redundant voltage selector (SHVS) of the present invention. In the FIG., three identical electrical UNITS $A_1$, $A_2$, and $A_3$ provide triple redundant output voltages $V_1$, $V_2$, and $V_3$. The three units can be controlled by other units (not shown), such that the inputs to $A_1$, $A_2$, and $A_3$ are identical. In such a manner of operation voltages $V_1$, $V_2$, and $V_3$ would usually be approximately equal.

One of the three output voltages, $V_1$, $V_2$ or $V_3$, drives another electrical stage UNIT B as shown in FIG. 1 which is connected to the voltages by means of switches 10 and 11. In the FIG., two relays 10 and 11 are controlled by the second-highest voltage selector 12 of the present invention. To simplify the explanation, the coil portions of the relays 10 and 11 which are located within the SHVS 12 are not shown. When the relay arms are in the position $10a$ and $11a$, respectively, as shown in FIG. 1, voltage $V_1$ drives UNIT B. If the arm of relay 10 is thrown into position $10b$ and the arm of relay 11 remains in position $11a$, voltage $V_2$ will now drive UNIT B. If the arm of relay 11 is thrown to position $11b$, voltage $V_3$ now drives UNIT B.

If voltages $V_1$, $V_2$, and $V_3$ are fixed or varying DC voltages of the proper magnitude and frequencies, the the converters $C_1$, $C_2$, and $C_3$ of FIG. 1 would not be required in the circuit. In this case $V_1$, $V_2$, and $V_3$ would be fed directly into the SHVS 12. If the converters $C_1$, $C_2$, and $C_3$ are used, the converter output voltages, $V_{1C}$, $V_{2C}$, and $V_{3C}$ are fixed or varying DC voltages which are proportional to $V_1$, $V_2$, and $V_3$, respectively.

Voltages $V_{1C}$, $V_{3C}$ may also be proportional to characteristics other than voltage magnitude. If the frequency of $V_1$, $V_2$, and $V_3$ is to be monitored, the converters can be frequency-to-DC voltage converters, and thus $V_{1C}$, $V_{2C}$, and $V_{3C}$ can be DC voltages proportional to the frequencies of $V_1$, $V_2$, and $V_3$, respectively.

If two of the three redundant voltages, $V_1$ and $V_3$, for example, are nearly equal, and the third, $V_2$, differs considerably from the other two, it can be assumed that $V_1$ and $V_3$ are within acceptable limits and that $V_2$ is faulty. Therefore, either $V_1$ or $V_3$ should be selected to drive UNIT B. If the second-highest of the three input voltages is selected, it will always be one of the two acceptable voltages.

For example, assume that $V_1$ is 5.01 volts, $V_3$ is 4.99 volts and $V_2$ is zero volts. Then $V_3$, one of the two acceptable voltages, is the second-highest voltage. Assume that $V_3$ is 6.7 volts, $V_1$ is 5.3 bolts and $V_2$ is 5.2 volts. Then $V_1$, one of the two acceptable voltages, is the second-highest voltage. When all three voltages are acceptable, the second-highest voltage will also be the one which is nearest to the average value of the three voltages.

The system of FIG. 1 can be operated in either of two methods. In one method the system output voltage $V_S$ will be at all times the second-highest of the three voltages $V_1$, $V_2$, and $V_3$. (It is assumed that voltage magnitude is being monitored). The SHVS 12 compares the converter output voltages, $V_{1C}$, $V_{2C}$, and $V_{3C}$, and switches relays 10 and 11 so that $V_S$ is the second2highest of the voltages $V_1$, $V_2$, and $V_3$. That is, the switches 10 and 11 are responsive to the output voltage of SHVS 12 to thereby couple the redundant voltage to the electrical UNIT B.

Voltages $V_{1C}$, $V_{2C}$, and $V_{3C}$ are also fed into the percentage voltage difference indicator 13 which is disclosed in pending Pat. application, Ser. No. 825,699, filed May 19, 1969, entitled A Redundant Voltage Percentage Voltage Difference Indicator, by Walter Ellermeyer. When any one of the three SHVS input voltages, $V_{3C}$, for example, differs from the sum of the other two, $V_{1C}$ and $V_{2C}$, by more than a selectively predeterminable percentage, the output voltage, $V_F$, of the PVDI will change from zero to a fixed voltage such as plus ten volts, for example. When $V_F$ changes from zero to a fixed voltage, the alarm 15 is triggered, indicating that one of the three voltages is faulty. In the above-described method of operation, voltage $V_F$ does not affect the operation of the SHVS 12.

The system of FIG. 1 can also be operated in an alternate manner. As long as none of the three voltages $V_{1C}$, $V_{2C}$, or $V_{3C}$, differ from the other two by more than 1 percent or some other selectively predetermined percentage, $V_1$ will drive UNIT B, as shown in FIG. 1. This is true even though $V_1$ is not the second-highest redundant voltage. When any one of the three SHVS input voltages $V_{1C}$, $V_2C$, or $V_{3C}$ differs from the other two by more than 1percent, $V_F$ changes from zero to a fixed voltage. When this occurs, the SHVS will switch relays 10 and 11 so that UNIT B is connected to the second-highest redundant voltage. If $V_1$ is the second-highest redundant voltage, neither relay is switched.

The main advantage of the alternate method of operation described above is that needless switching of the input voltages is prevented if they drift FIG., above and below each other. If relays 10 and 11 are break-before-make relays, such switching can produce transients in the output voltage $v_S$.

Figure 2:
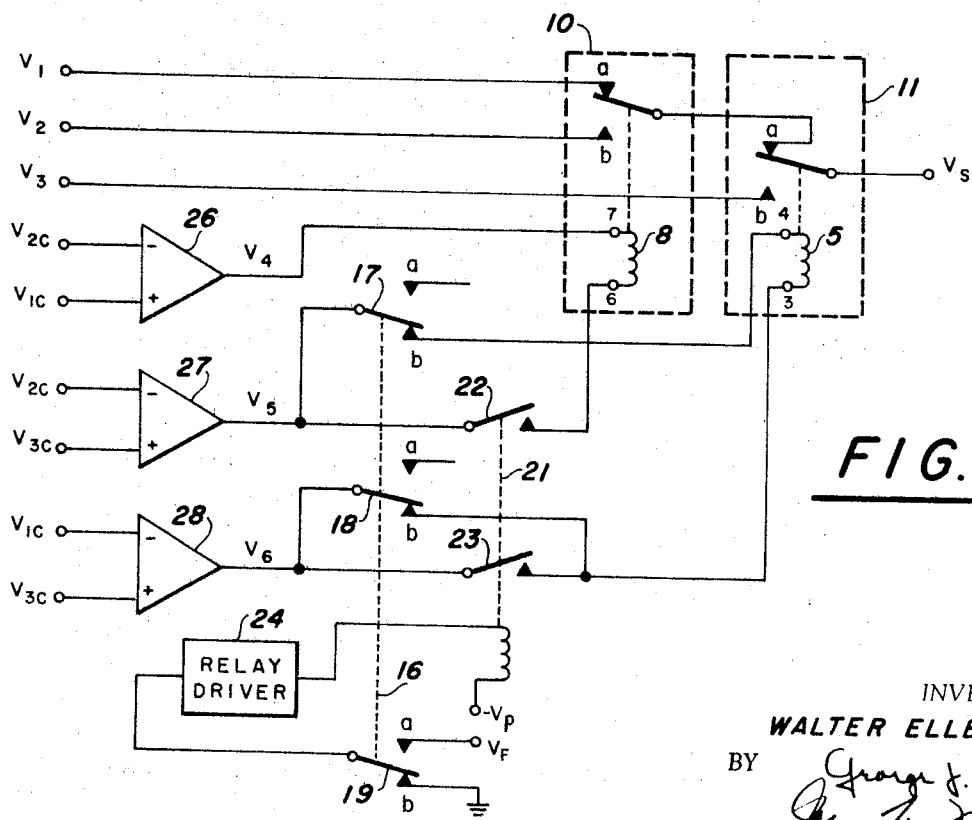
FIG. 2 is a schematic drawing of the second-highest redundant voltage selector of the present invention.

FIG. 2 is a schematic circuit diagram of the preferred form of the Second Highest Voltage Selector (SHVS) 12 of FIG. 1. In the FIG., components 26, 27, and 28 are conventional differential operational amplifiers which function as comparators in the circuit. A different combination of two of the three DC voltages, $V_{1C}$, $V_{2C}$, and $V_{3C}$, is applied to the input terminals of each of the three comparators. That is, voltages $V_{2C}$ and $V_{1C}$ are connected to the negative and positive input terminals, respectively, of comparator 26; $V_{2C}$ and $V_{3C}$ are connected to the negative and positive input terminals, respectively, of comparator 27; and, $V_{1C}$ and $V_{3C}$ are connected to the negative and positive input, respectively, of comparator 28. As previously mentioned voltages $V_{1C}$, $V_{2C}$, and $V_{3C}$ are proportional to $V_1$, $V_2$, and $V_3$, respectively.

If the voltage $V_{2C}$ which is connected to the negative input terminal of a differential operational amplifier 26 is more positive than the voltage $V_{1C}$ which is connected to the positive input terminal, the amplifier output voltage $V_4$ will be equal to the maximum negative output voltage of the amplifier. A typical value for $V_4$ is minus 10 volts, for example.

If the voltage $V_{1C}$ connected to the positive input terminal is more positive than the voltage $V_{2C}$ connected to the negative input terminal, the output voltage $V_4$ will be equal to the maximum positive output voltage of the amplifier. A typical value for $V_4$ in this case is plus 10 volts.

Operational amplifiers, i.e., comparators, 27 and 28, operate in an identical manner as that described above for operational amplifier 26.

Thus it can be seen that each of the three comparators function to indicate which of the two voltages applied to it has the highest magnitude.

Table 1 is a "truth table" which lists all possible combinations, HIGHEST, SECOND-HIGHEST, and LOWEST, of the SHVS input voltages $V_{1C}$, $V_{2C}$, and $V_{3C}$, of FIG. 2. For each of these combinations, the table lists $V_4$, $V_5$, and $V_6$, the output voltages of comparators 26—28, respectively. The table also lists the absolute value of the voltage difference, $V_{4-5}$, between the outputs of comparators 26 and 27, and the absolute value of the voltage difference, $V_{5-6}$, between the outputs of comparators 27 and 28.

TABLE 1

| | COLUMNS | | | | | |
|---|---|---|---|---|---|---|
| | 1 | 2 | 3 | 4 | 5 | 6 |
| SHVS Input voltages: | | | | | | |
| Highest | $V_{2C}$ | $V_{3C}$ | $V_{1C}$ | $V_{3C}$ | $V_{1C}$ | $V_{2C}$ |
| Second-highest | $V_{1C}$ | $V_{1C}$ | $V_{2C}$ | $V_{2C}$ | $V_{3C}$ | $V_{3C}$ |
| Lowest | $V_{3C}$ | $V_{2C}$ | $V_{3C}$ | $V_{1C}$ | $V_{2C}$ | $V_{1C}$ |
| $V_4$ | −10 | +10 | +10 | −10 | +10 | −10 |
| $V_5$ | −10 | +10 | −10 | +10 | +10 | −10 |
| $V_6$ | −10 | +10 | −10 | +10 | −10 | +10 |
| $V_{4-5}$ | 0 | 0 | 20 | 20 | 0 | 0 |
| $V_{5-6}$ | 0 | 0 | 0 | 0 | 20 | 20 |

It can be seen from FIG. 2 that coils 5 and 8 are connected so as to be responsive to the voltage differences $V_{4-5}$ and $V_{5-6}$ of the three comparators. Coil 5 and coil 8 have ends 4 and 6, respectively, connected to the output terminal of the same comparator 27. The other end 3 of coil 4 is connected to the output terminal of comparator 28, and end 7 of coil 8 is connected to the output terminal of comparator 26.

Thus, if voltages $V_4$ and $V_5$ have the same polarity, the voltage difference between them, $V_{4-5}$, will be zero, and consequently, relay 10 will not be energized. If voltages $V_5$ and $V_6$ have the same polarity, the voltage difference between them, $V_{5-6}$, is zero, and consequently, relay 11 will not energized. If relays 10 and 11 are not energized, the arm of relay 10 will be in position 10a and the arm of relay 11 will be in position 11b. Therefore, the output voltage $V_S$ will be identical to $V_1$. It can be seen from Table 1 that $V_{4-5}$ and $V_{5-6}$ are both zero only if $V_{1C}$ is the SECOND-HIGHEST input voltage (COLUMNS 1 and 2).

If voltages $V_4$ and $V_5$ have opposite polarities, the voltage difference between them, $V_{4-5}$, is a positive value such as 20 volts, for example. Relay 10 will thus be energized. It can be seen from Table 1 that $V_{4-5}$ will be equal to 20 volts, for example, only if $V_{2C}$ is the SECOND-HIGHEST input voltage (COLUMNS 3 and 4). Also, if $V_{2C}$ is the SECOND-HIGHEST input voltage, $V_5$ and $V_6$ have the same polarity, and $V_{5-6}$ is zero. When $V_{5-6}$ is zero, relay 11 will not be energized and thus the arm of relay 11 will be in the position 11a as shown in FIG. 2. If relay 10 is energized, the arm will be thrown to position 10b. Therefore, the output voltage $V_S$ will be identical to $V_2$ if $V_{2C}$ is the SECOND-HIGHEST input voltage.

When voltages $V_5$ and $V_6$ have opposite polarities, the voltage between them, $V_{5-6}$, is a positive value such as 20 volts, for example. Relay 11 will thus be energized. When relay 11 is energized the arm is thrown to position 11b and output voltage $V_S$ is identical to $V_3$. It can be seen from Table 1 that $V_{5-6}$ is equal to 20 volts, only when $V_{3C}$ is the SECOND-HIGHEST input voltage (COLUMNS 5 and 6).

Thus, the output voltage $V_S$ will always be equal to the second-highest of the three redundant voltages $V_1$, $V_2$, and $V_3$. Whenever any one of the voltages $V_{1C}$, $V_{2C}$, and $V_{3C}$ differ from the other two by more than 1 percent, for example, the output voltage $V_F$ of PVDI 13 will change from zero to a fixed value, and the alarm 15 of FIG. 1 will be triggered. With the arms 17, 18, and 19 of switch 16 in the position 17b, 18b, and 19b, respectively, as shown, the output voltage $V_F$ of PVDI 13 will not affect the operation of the circuit.

The alternate manner of operation of the system of FIG. 1 previously mentioned can be selected by manually positioning the arms of three-pole switch 16 to the 17a, 18a, and 19a positions. In this position arms 18 and 19 are open. Therefore, relays 10 and 11 will be deenergized unless the arms 22 and 23 of relay 21 are closed. If relays 10 and 11 are deenergized, the arms of these relays will be in the 10a and 11a positions shown in FIG. 2, and the output voltage $V_S$ will be identical to $V_1$.

If arm 19 of switch 16 is in the position 19a, a conventional negative logic relay driver, 24, is connected to the output voltage $V_F$ of PVDI 13 of FIG. 1. If $V_F$ is zero volts, the output of logic driver 24 is an open circuit and relay 21 will be deenergized. If, however, $V_F$ is minus 10 volts, the output of logic driver 24 is connected to ground, and relay 21 will be energized. If relay 21 is energized, the arms 22 and 23 are closed, and thus the circuit will operate in exactly the same manner as previously described for the first method of operation.

If, for example, initially the voltage $V_{1C}$ is 0.9 percent higher than $V_{3C}$, and 1 percent higher than $V_{2C}$, the arms of relays 10 and 11 will be in the position 10a and 11a shown in FIG. 2. Thus, the output voltage $V_S$ will be identical to input voltage $V_1$. If $V_1$ then increases so that it is more than 1 percent greater than $V_{3C}$ $V_F$ will change from zero to minus ten volts. This will energize relay 21, thereby closing arms 22 and 23. This action connects one end 3 of the coil 5 of relay 11 to the output voltage $V_6$ of amplifier 28; the other end 4 of the coil 5 is connected to the output voltage $V_5$ of amplifier 27. The voltage, $V_{5-6}$, between the outputs of amplifiers 27 and 28 is 20 volts (Table 1, COLUMN 5). This voltage energizes relay 11, thereby throwing the arm of relay 11 to the position 11b. Voltage V S then becomes identical to $V_3$.

It can be seen that, as in the example given above, the output voltage $V_S$ ay be a faulty input voltage until relay 21 is energized. However, when the arms 17, 18, and 19 of switch 16 are in the positions 17b, 18b, and 19b, respectively, $V_S$ is always one of the two acceptable input voltages. As previously mentioned, the purpose of the alternate method of operation described above is to eliminate the transients which can occur in the output voltage $V_S$ if $V_1$, $V_2$ and $V_3$ are all within acceptable limits but drift above and below each other.

From Table 1 it can be seen that current may flow in either direction through the coil 8 of relay 10 of FIG. 2. Current may flow from the output of amplifier 26 to the output of amplifier 27 (COLUMN 3); or it may flow from the output of amplifier 27 to the output of amplifier 26 (COLUMN 4). Relays 10 and 11 must therefore be neutral, i.e., nonpolarized relays.

Figure 3:
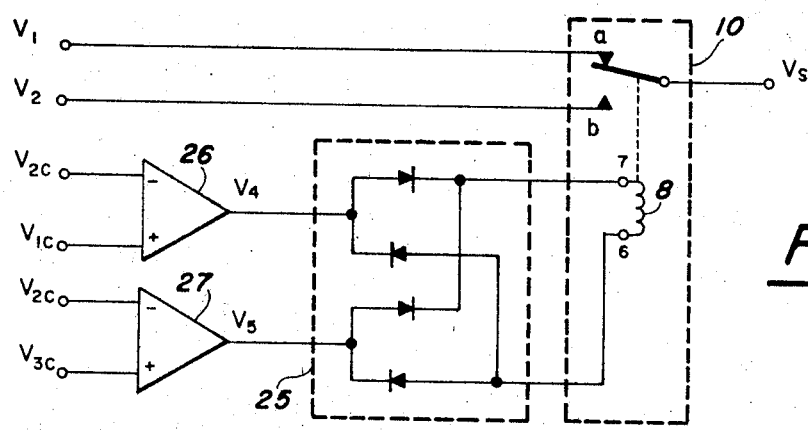
FIG. 3 is a schematic drawing of an alternate form of the present invention which can be used with polarized relays.

If the use of polarized relays is desired, the circuit of FIG. 2 may be modified as shown in FIG. 3 wherein only that portion of the circuit which is required for explanation is shown. A conventional bridge rectifier 25 is connected between the coil 8 of relay 10 and the outputs of amplifiers 26 and 27. Current will always flow through the coil 8 of relay 10 from point 7 to point 6, regardless of the polarities of the amplifier output voltages $V_4$ and $V_5$. An identical circuit (not shown) would connect the outputs of amplifiers 27 and 28 of FIG. 2, to the coil 5 of relay 11. Switch 16 and relay 27 of FIG. 2 may also be used with the bridge circuit shown in FIG. 3 but are also not shown to simplify the explanation. Use of such a bridge circuit will also be advantageous in that the high voltages which would be generated in the coils of 10 and 11 when the current flowing through these coils is reduced to zero may be suppressed.

Figure 4:
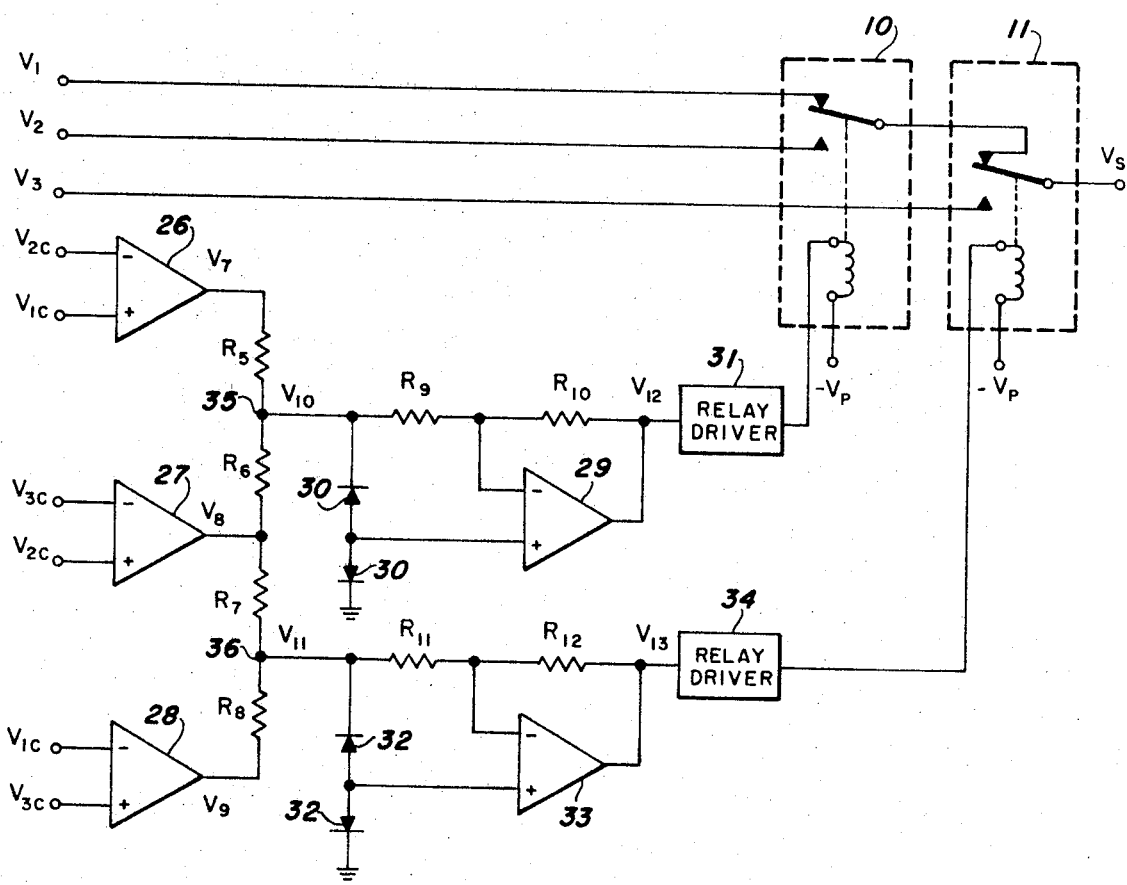
FIG. 4 is another alternate form of a second-highest voltage selector of the present invention.

An alternate form of the invention is shown in FIG. 4. The circuit shown is especially suitable for driving large relays and relays having varying voltage requirements.

In the FIG., three comparators 26, 27, and 28, are shown having applied at the input terminals thereof voltages $V_{2C}$ and $V_{1C}$, $V_{3C}$ and $V_{2C}$, and $V_{1C}$ and $V_{3C}$, respectively. The output terminals of comparators 26 and 27 are connected by means of equal resistors $R_5$ and $R_6$, respectively, to a first junction point 35. Likewise the output terminals of comparators 27 and 28 are connected by means of equal resistors $R_7$ and $R_8$ to a second junction point 36. The operation of comparators 26, 27, and 28 is identical to that of the comparators of FIG. 2.

Thus, if resistors $R_5$ and $R_6$ are equal and if the polarities of the comparator output voltages $V_7$ and $V_8$ are the same, $V_10$ is equal to $V_7$ which is equal to $V_8$. If the polarities of $V_7$ and $V_8$ are opposite, $V_{10}$ equals zero. For example, if $V_7$ nd $V_8$ are both plus 10 volts, $V_0$ will be plus 10 volts. If $V_7$ and $V_8$ are both 10 volts, $V_{10}$ will be 10 volts, and if $V_7$ is plus ten volts and $V_8$ is minus 10 volts, $V_{10}$ is zero. Thus, it can be seen that the value of voltage $V_{10}$ depends upon which of the three voltages applied to the comparators 26 and 27 has the highest magnitude.

Since resistors $R_7$ and $R_8$ are also equal, the above statements concerning voltages $V_7$, $V_8$, and $V_{10}$, also apply to voltages $V_8$, $V_9$, and $V_{11}$, respectively.

The combination of resistors $R_9$, $R_{10}$, operational amplifier 29, and the two diodes 30 connected to the positive input of amplifier 29 comprises a conventional absolute value circuit. If resistors $R_9$ and $R_{10}$ re equal, voltage $V_{12}$ ill be equal to the negative absolute value of input voltage $V_{10}$. If $V_{10}$ is plus 10 volts, $V_{12}$ is minus 10 volts, if $V_{10}$ is minus 10 volts, $V_{12}$ is minus 10 volts.

Component 31 is a conventional negative logic relay driver. If the output voltage $V_{12}$ of the absolute value circuit is zero volts, the output of relay driver 31 is an open circuit, and relay 10 is not energized. If $V_{12}$ is minus 10 volts, the output of 31 is connected to ground and relay 10 is energized.

The circuit consisting of amplifier 33, the components connected to it, logic relay driver 34 and relay 11 is identical to the circuit consisting of amplifier 29, the components connected to it, logic relay driver 31 and relay 10.

Table 2 is a "truth table" for the circuit of FIG. 4. From this table it can be seen that voltages $V_{12}$ and $V_{13}$ are both zero only if $V_{1C}$ is the SECOND-HIGHEST input voltage (COLUMNS 1 and 2). If $V_{12}$ and $V_{13}$ are both zero, relays 10 and 11 are deenergized and $V_S$ is identical to $V_1$.

TABLE 2

|  | COLUMNS | | | | | |
| --- | --- | --- | --- | --- | --- | --- |
|  | 1 | 2 | 3 | 4 | 5 | 6 |
| SHVS Input Voltages: | | | | | | |
| Highest | $V_{2C}$ | $V_{3C}$ | $V_{1C}$ | $V_{3C}$ | $V_{1C}$ | $V_{2C}$ |
| Second-highest | $V_{1C}$ | $V_{1C}$ | $V_{2C}$ | $V_{2C}$ | $V_{3C}$ | $V_{3C}$ |
| Lowest | $V_{3C}$ | $V_{2C}$ | $V_{3C}$ | $V_{1C}$ | $V_{2C}$ | $V_{1C}$ |
| $V_7$ | −10 | +10 | +10 | −10 | +10 | −10 |
| $V_8$ | +10 | −10 | +10 | −10 | −10 | +10 |
| $V_9$ | −10 | +10 | −10 | +10 | −10 | +10 |
| $V_{10}$ | 0 | 0 | +10 | −10 | 0 | 0 |
| $V_{11}$ | 0 | 0 | 0 | 0 | −10 | +10 |
| $V_{12}$ | 0 | 0 | −10 | −10 | 0 | 0 |
| $V_{13}$ | 0 | 0 | 0 | 0 | −10 | −10 |

From the table it can also be seen that $V_{12}$ is minus 10 volts only if $V_{2C}$ is the SECOND-HIGHEST input voltage (COLUMNS 3 and 4). Also, if $V_{12}$ is minus 10 volts, $V_{13}$ is zero volts. If $V_{12}$ is minus 10 volts and $V_{13}$ is zero volts, relay 10 is energized and relay 11 is deenergized; thus $V_S$ is identical to $V_2$.

In the same manner, $V_{13}$ is minus 10 volts only if $V_{34}$ is the SECOND-HIGHEST input voltage (COLUMNS 5 and 6). If $V_{13}$ is minus 10 volts, relay 11 is energized and $V_S$ is identical to $V_3$.

Thus, it can be seen that relays 10 and 11 are responsive to the output voltages of the relay drivers 31 and 34, respectively, to select the redundant voltage having the second-highest magnitude. Therefore, the output voltage $V_S$ will be equal to the second-highest input voltage at all times.

Conventional negative logic relay drivers 31 and 34 each consist basically of a transistor which is biased to cutoff when the input voltage is zero. When the input voltage is minus 10 volts, the transistor conducts freely, and the outputs of 31 and 34 are essentially grounded. Power transistors can be used. The voltage which is required to drive relays 10 and 11 is designated as $-V_P$. This voltage, which permits the use of high-power, high-voltage relays, can be furnished by a conventional power supply or generator.

If the polarities of the diodes 30 and 32 of FIG. 4 are reversed, voltages $V_{12}$ and $V_{13}$ will be equal to the positive (instead of negative) absolute value of $V_{10}$ and $V_{11}$. respectively.

Switch 16, relay driver 24, and relay 21 of FIG. 2 can also be used with the circuit of FIG. 4. Relay arms 17 and 22 of FIG. 2 can be inserted between the output of driver 31 and the coil of relay 10 of FIG. 4; and relay arms 18 and 23 of FIG. 2 can be inserted between the output of driver 34 and the coil of relay 11 of FIG. 4. Operation of relays 10 and 11 would then be identical to that described for the alternate manner of operation of FIG. 2.

From an understanding of the description of the foregoing it can be seen that a new and improved second-highest voltage selector for use with triple redundant voltages has been disclosed. The PVDI is more accurate than prior art devices which introduce comparatively large errors into the output voltage. If high quality relay contacts are used in the circuits of FIGS. 2 and 4, no appreciable error is introduced into the output voltage $V_S$.

The invention may be used to monitor any physical quantity which can be converted to a fixed or varying DC voltage such as, for example, high or low DC voltages, AC voltages, frequency, pulse amplitudes, pulse modulating voltages, radio transmitter outputs, etc. Monitored voltages do not need to be in phase and the invention can also control very high currents. Prior art devices can only be used with voltages which are in-phase and which have moderate amplitudes and frequencies. Furthermore, these devices furnish only small currents.

It is very undesirable to have three good redundant voltages fed into a redundant voltage selector and nevertheless have a faulty output voltage produced by a malfunction in the selector. Regardless of any malfunction in the circuit of the invention, the output voltage will be good if the three redundant input voltages are good. This is due to the connections of the contacts of relays 10 and 11 of FIGS. 2 and 4. Regardless of whether relays 10 and/or 11 are energized or deenergized, the arm of relay 11 will be connected to $V_1$, $V_2$, or $V_3$. Also, none of the three redundant voltages will ever be connected to each other. Failure of the components of the prior art can produce a faulty output voltage even if all three input voltages are good. Failure of these components may result in the connection of the input voltages to each other.

Obviously many modifications and variations of the present invention are possible in the light of the above teachings. It is therefore to be understood that within the scope of the appended claims, the invention may be practiced otherwise than as specifically described. For example, in the circuit of FIG. 2, the relay coils are connected between the outputs of amplifiers 26 and 27, and the outputs of amplifiers 27 and 28. When $V_{2C}$ is the second-highest input voltage, the coil connected between 26 and 27 is energized, and when $V_{3C}$ is the second-highest voltage, the coil connected between 27 and 28, is energized. A relay coil could also be connected between the outputs of amplifiers 26 and 27. This relay would be energized when $V_{1C}$ is the second-highest voltage. If an additional relay is connected between the outputs of amplifiers 26 and 27, three single-throw relays could be used instead of the two double-throw relays shown in FIG. 2. Three single-throw relays would not have the advantages of the two double-throw relays which were described previously, but single-throw relays would be faster acting than double-throw relays. Also electronic switches are usually single throw, although double-throw electronic switches are available.

Furthermore, three single-throw relays could also be used with the circuit of FIG. 4. A voltage divider would be connected between the outputs of amplifiers 28 and 26. To the midpoint of this voltage divider would be connected a circuit identical to that which is connected to the point labeled $v_{10}$ in FIG. 4.

I claim:

1. A system for monitoring the relative magnitude of first, second and third redundant voltages comprising:
 a. first, second and third converter means;
 b. each of said converter means being responsive to one of said redundant voltages to produce a DC voltage proportional to said one redundant voltage;
 c. means responsive to the first, second and third DC voltages thereby produced to continually compare the magnitude of said DC voltages and to provide an output voltage which indicates which of the said redundant voltages has the second-highest magnitude;
 d. said means including switch means operatively connected between said three redundant voltages and an electrical unit to be driven by one of said redundant voltages; and
 e. said switch means being responsive to said output voltage to thereby couple the redundant voltage having the second-highest magnitude to said electrical unit.

2. The system of claim 1 wherein said means responsive to said DC voltages includes:
 a. three comparator means, each of said comparator means having applied at the input terminals thereof a different combination of two of the three DC voltages; and
 b. each of said comparator means being operable to indicate which of the two DC voltages applied to it has the highest magnitude and which has the lowest magnitude.

3. The system of claim 2 wherein each of said switch means includes two electromagnetic relays, each of said relays having a coil connected at one end thereof to the output terminal of the same comparator means and connected at the other end thereof to the output terminal of a different one of the other two comparator means.

4. The system of claim 1 wherein said means responsive to said DC voltages further includes bridge rectifier means connected between each of said coils and the output terminals of two of said three comparators.

5. The system of claim 1 further including means responsive to said DC voltages to produce an output voltage indicative of a selectively predetermined percentage difference between any one of the three DC voltages and the sum of the other two DC voltages.

6. A system for monitoring the relative magnitudes of first, second and third redundant voltages comprising:
 a. means responsive to said redundant voltages to continually compare and to provide an output voltage which indicates which of the said redundant voltages has the second-highest magnitude;
 b. said means including switch means operatively connected between said redundant voltages and an electrical unit to be driven by one of said redundant voltages; and
 c. said switch means being responsive to said output voltage to thereby couple the redundant voltage having the second-highest magnitude to said electrical unit.

7. The system of claim 6 wherein said means responsive to said output voltage includes:
 a. three comparator means, each of said comparator means having applied at the input terminals thereof a different combination of two of said three redundant voltage; and
 b. each of said comparator means being operable to indicate which of the two redundant voltages applied to it has the highest magnitude and which has the lowest magnitude.

8. The system of claim 7 wherein each of said switch means includes two electromagnetic relays, each of said relays having a coil connected at one end thereof to the output terminal of the same comparator means and connected at the other end thereof to the output terminal of a different one of the other two comparator means.

9. The system of claim 6 wherein said means responsive to said redundant voltages further includes bridge rectifier means connected between each of said coils and the output terminals of said comparators.

10. The system of claim 6 further including means responsive to said redundant voltages to produce an output voltage indicative of a selectively predetermined percentage difference between any one of said redundant voltages and the sum of the other two voltages.

11. A second-highest voltages selector for use with triple redundant voltages comprising:
 a. three redundant voltages $V_1$, $V_2$, and $V_3$;
 b. first, second and third comparator means having applied at the input terminals thereof voltages $V_{2C}$ and $V_{1C}$, $V_{3C}$ and $V_{2C}$, $V_{1C}$ and $V_{3C}$, respectively, wherein voltages $V_{1C}$, $V_{2C}$ and $V_{3C}$ are proportional to voltages $V_1$, $V_2$ and $V_3$, respectively;
 c. the output terminals of said first and second comparator means being connected by means of equal resistors to a first junction point;
 d. the output terminals of said second and third comparator means likewise being connected by means of equal resistors to a second junction point;
 e. first and second absolute value circuit means; value f. said first junction point being connected to the input terminal of said first absolute value circuit;
g. said second junction point being connected to the input terminal of said second absolute value circuit;
h. first and second negative logic relay driver means;
i. said first driver means having the output terminal of said first absolute value circuit connected to the input terminal thereof;
j. said second driver means having the output terminal of said second absolute valve circuit connected to the input terminal thereof; and
k. switch means responsive to the output voltages of said first and second driver means to select the redundant voltage having the second-highest magnitude.